US005486032A

United States Patent [19]
Reed et al.

[11] Patent Number: 5,486,032
[45] Date of Patent: Jan. 23, 1996

[54] TAILGATE WITH AIR FOIL

[76] Inventors: Russ A. Reed, 506 Cranbrook; Brian A. Jones, 1602 Lancelot Cir., both of Grand Prairie, Tex. 75050

[21] Appl. No.: 343,777

[22] Filed: Nov. 22, 1994

[51] Int. Cl.⁶ .................................................. B62D 35/00
[52] U.S. Cl. ........................................ 296/50; 296/180.1
[58] Field of Search ........................... 296/50, 56, 180.1, 296/180.5

[56] References Cited

U.S. PATENT DOCUMENTS

| | | | |
|---|---|---|---|
| 4,165,118 | 8/1979 | Jensen | 296/50 |
| 4,200,328 | 4/1980 | Morgan. | |
| 4,201,411 | 5/1980 | Morgan | 296/180.1 X |
| 4,867,499 | 9/1989 | Stephan et al. . | |
| 5,076,636 | 12/1991 | Buck et al. . | |
| 5,083,829 | 1/1992 | Fonseca . | |
| 5,232,260 | 8/1993 | Lippard | 296/180.5 X |
| 5,234,249 | 8/1993 | Dorrell . | |
| 5,236,242 | 8/1993 | Seeman . | |
| 5,324,092 | 6/1994 | Burg | 296/180.1 |
| 5,352,008 | 10/1994 | Denvir | 296/56 X |

*Primary Examiner*—Joseph D. Pape
*Attorney, Agent, or Firm*—Gregory M. Howison; Joe H. Shallenburger

[57] ABSTRACT

A tailgate for a pickup truck (10) includes an integrated air foil mechanism mounted in an open top cargo area (12) defined by two side walls (14) and (16), a front end and an open trailing end. The tailgate includes two control frames (20) and (22), a main air foil wing (24) and control apparatus. The two control frames (20) and (22) are mounted on the pickup truck side walls (14) and (16) at the open trailing end of the cargo area. The main air foil wing (24) has two ends, each end pivotally mounted to the control frames (20) and (22), such that the main air foil wing (24) spans the opening between the control frames (20) and (22). The control apparatus is operable such that tension from the control apparatus mounted in the control frames (20) and (22) causes the air foil (24) to be parallel with the control frames (20) and (22) until the pickup (10) reaches a sufficient speed causing the main air foil wing (24) to pivot, such that it is perpendicular to the control frame, thereby creating a downwards force. An auxiliary air foil wing (26) is mounted to the control frames (20) and (22) and is controlled by the control apparatus, as is the main air foil wing (24), such that the control apparatus keeps the auxiliary air foil wing (26) parallel with the control frame until the pickup truck (10) reaches a sufficient speed, whereas the auxiliary air foil wing (26) pivots such that it is perpendicular to the control frame (20) and (22) and parallel with the main air foil wing (24). A servo motor (76) and control unit (82) are provided to control the pivot of the main air foil (24) and the auxiliary air foil wing (26).

8 Claims, 4 Drawing Sheets

5,486,032

TAILGATE WITH AIR FOIL

TECHNICAL FIELD OF THE INVENTION

The present invention relates in general to a tailgate for pickup trucks and, more particularly, to a tailgate for pickup trucks that reduces drag and produces a downward or upward force.

BACKGROUND OF THE INVENTION

A number of vehicles have an open-top cargo compartment which is closed at its rear end by a tailgate that can be opened to prevent access to the cargo compartment. Some examples are pickup trucks and various trailers which have an open top. Many of these vehicles are driven for significant distances with the cargo compartment completely or very lightly loaded. This is especially true with respect to pickup trucks where the primary use is for passenger transportation, their use for transportation of cargo being only incidental. These vehicles, by and large, have the rear end of the open top cargo compartment closed by a solid tailgate, which forms an integral part of the cargo bed structure, and thus, needs to be closed when the vehicle is in operation. Because of this, these vehicles are frequently driven with the solid tailgate in the closed position. This causes the tailgate to operate as an air brake, which significantly increases the air drag on the vehicle. The net result is a significant loss of fuel economy because of the power consumed in overcoming this air drag resistance.

Prior solutions to the air drag problem have utilized some type of perforated tailgate. One solution even employs louvers that open as wind velocity increases due to speed.

SUMMARY OF THE INVENTION

The invention disclosed and claimed herein comprises a tailgate with an air foil for a pickup truck having an open top cargo area defined by three side walls and an open trailing end. The tailgate includes two control frames, a main air foil wing and control apparatus. The two control frames are mounted on the pickup truck side walls at the open trailing end of the cargo area. The main air foil wing has two ends, each end pivotally mounted on the control frame, such that the main air foil wing spans the opening between the control frames. The control apparatus is operable such that tension from the control apparatus mounted in the control frames causes the air foil to be parallel with the control frames until the pickup reaches a sufficient speed causing the main air foil wing to pivot, such that it is perpendicular to the control frames, thereby creating an upward or downward directed force.

In another aspect of the present invention, an auxiliary air foil wing is provided. Each end of the auxiliary air foil wing is mounted to the control frames and is controlled by the control apparatus, as is the main air foil wing, such that the control apparatus keeps the auxiliary air foil wing parallel with the control frames until the pickup truck reaches a sufficient speed, whereas the auxiliary air foil wing pivots such that it is perpendicular to the control frames and parallel with the main air foil wing.

In another aspect of the present invention, a servomotor and control unit are provided to control the pivot of the main air foil and the auxiliary air foil wing.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
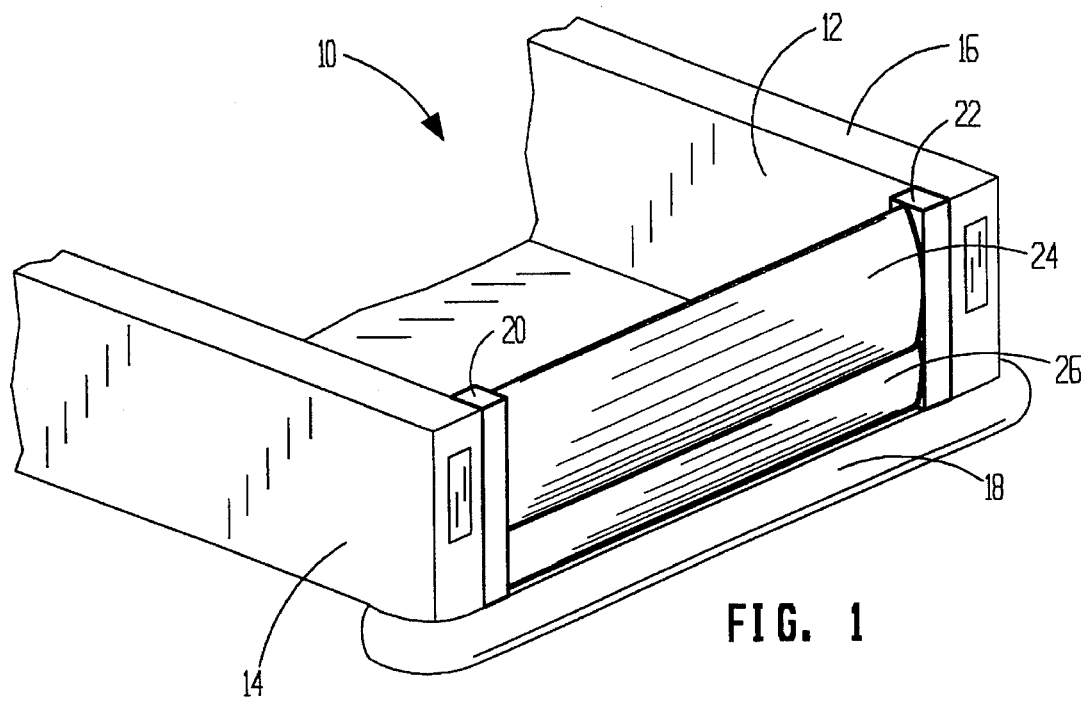
FIG. 1 illustrates a perspective view of the system of the present invention.

Referring now to FIG. 1, there is illustrated a perspective view of the system of the present invention. A pickup truck 10 is shown having an open end cargo area 12 defined by two side walls 14 and 16. A bumper 18 is attached at one end to side wall 14 and at the other end to side wall 16. Disposed immediately adjacent to side wall 14 is a control frame 20 and disposed immediately adjacent to side wall 16 is control frame 22.

Disposed between control frame 20 and control frame 22 where a conventional tailgate would be, is a main air foil 24. The main air foil 24 extends from the top of control frame 20 and the top of control frame 22 to approximately one-third of the distance from the bottom of control frame 20 and the bottom of control frame 22. An auxiliary air foil 26 is disposed below the main air foil 24 and above the bumper 18 extending from control frame 20 to control frame 22.

Figure 2:
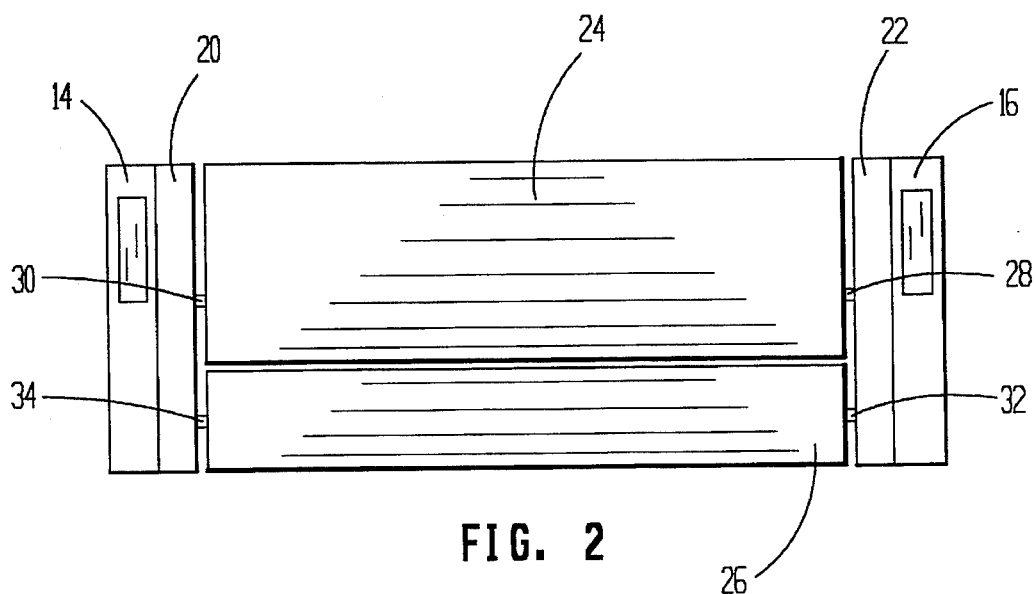
FIG. 2 illustrates a rear view of the system of the present invention.

Referring now to FIG. 2, there is illustrated a rear view of the system of the present invention. The control frame 20 is shown attached to side wall 14 of the pickup truck 10. Control frame 22 is shown attached to side wall 16 of the pickup truck. The main air foil 22 is shown disposed between control frame 20 and control frame 22, extending from a height equal to the height of control frames 22 and 20 to a height of about one-third or one-fourth the distance from the bottom of control frames 20 and 22. The main air foil 24 is pivotally attached to control frame 20 by a main pivot shaft 30. The main air foil 24 is attached to the control frame 22 by a main pivot shaft 28. The auxiliary air foil 26 is shown extending from just below the main air foil 24 downward such that the bottom of the auxiliary air foil 26 is even with the bottom of the control flames 20 and 22 and extending between control frames 20 and 22. The auxiliary air foil 26 is pivotally attached to control frame 20 by an auxiliary pivot shaft 34, and auxiliary air foil 26 is pivotally attached to control frame 22 by auxiliary pivot shaft 32.

Figure 3A:
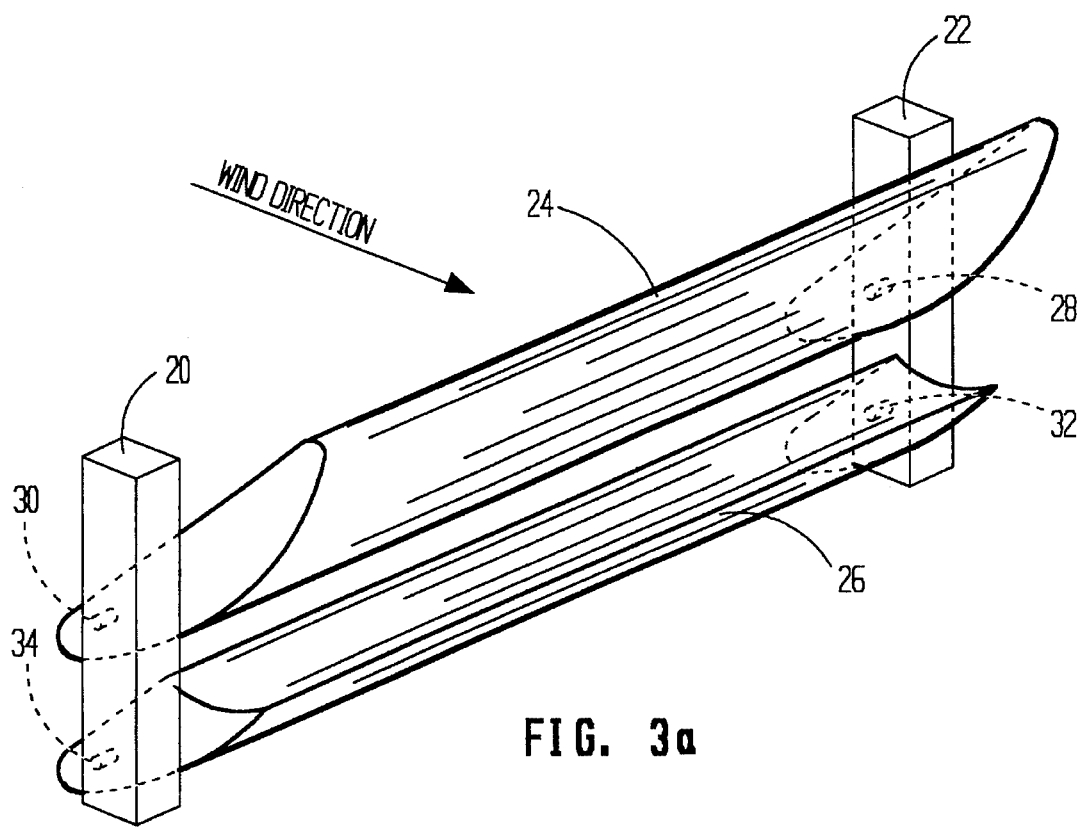
FIG. 3a illustrates a perspective view of the system of the present invention.

Referring now to FIG. 3a, there is illustrated a perspective view of the system of the present invention. The left control frame 20 and the right control frame 22 are shown. The main air foil 24 and the auxiliary air foil 26 are shown partially open. This is caused by the wind 36 blowing from a left to right direction across the main air foil 24 and the auxiliary air foil 26. The main air foil 24 and the auxiliary air foil 26 are linked to each other for coordinated pivotal movement. Main pivot shaft 30 is shown as is auxiliary pivot shaft 34.

Figures 3B, 3C:
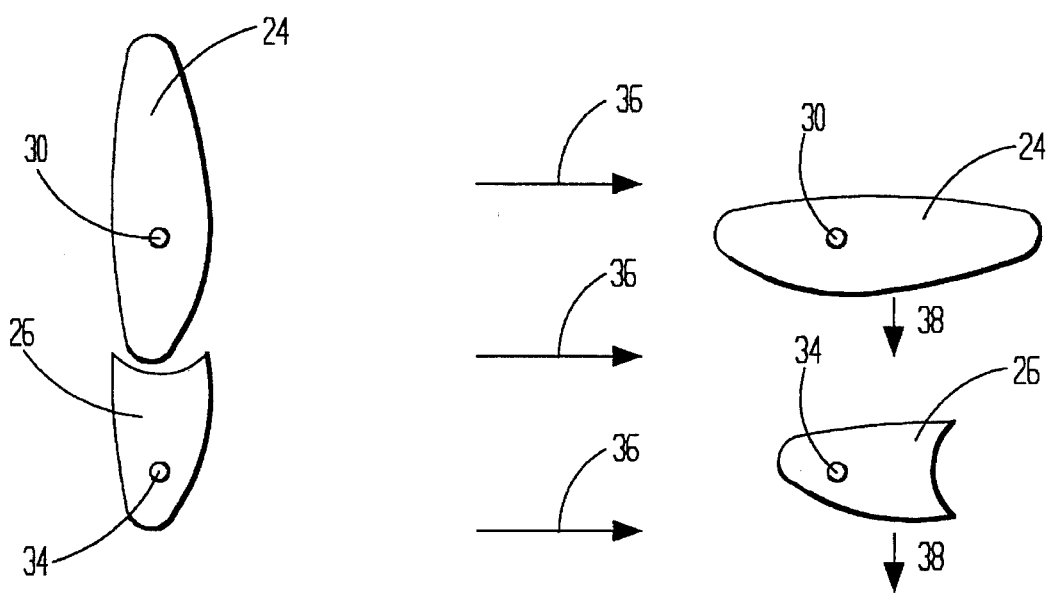
FIG. 3b illustrates a side cross-sectional view of the system of the present invention.
FIG. 3c illustrates a side cross-sectional view of the system of the present invention in an open position.

Referring now to FIG. 3b, there is illustrated a side cross-sectional view of the system of the present invention. The main air foil 24 and the auxiliary air foil 26 are illustrated in a closed position perpendicular to the plane of the movement of the pickup truck 10 (not shown). Main air foil 24 and auxiliary air foil 34 are illustrated in a closed position being rotated fully closed by main pivot shaft 30 and auxiliary pivot shaft 34, respectively.

Referring now to FIG. 3c, there is illustrated a side cross-sectional view of the system of the present invention in an open position. The wind 36 causes the main air foil 24 and the auxiliary air foil 26 to rotate to a position parallel to that of the wind 36. In this embodiment, since the convex side of the air foil wings 24 and 26 faces downward, the air moving on the underneath side of main air foil 24 and auxiliary air foil 36 moves faster than the air moving along the upper side of main air foil 24 and auxiliary air foil 26. When this occurs, the lower air pressure underneath the air foils 24 and 26, respectively, causes a downward force indicated by arrows 38 on each of air foils 24 and 26, respectively. It should be noted that in these FIGS. 3a–3c, even though the air foils 24 and 26 are positioned such that they produce a downward force, the air foils may be installed in a reverse direction such that they are upside down from that shown in FIG. 3b, with their convex side facing upward, such that they produce an upwards force when opened. This would cause a lift to be created by the wind foils 24 and 26.

In operation, the system is mounted on the open end of an open bed pickup truck 10 as shown in FIG. 1. A control apparatus (not shown) in the control flames 20 keeps the main air foil 24 and the auxiliary air foil 26 positioned while the pickup truck 10 is at rest. Once the pickup truck 10 begins to move, the wind 36 (as shown in FIG. 3a) begins to move the air foil 24 and the auxiliary air foil 26. The air foils 24 and 26 are moved rearwardly toward a position parallel with the ground as shown in FIG. 3c. The control apparatus (not shown) links the main air foil 24 and the auxiliary air foil 26 to each other for coordinated pivotal movement about their respective horizontal axes. Once the pickup truck 10 is moving at a fast enough rate of speed, the wind 36 causes the main air foil 24 and the auxiliary air foil 26 to become horizontal and parallel with the direction of the wind 36. This accommodates a substantially unrestricted flow of air between the louvers. The wind 36 then moves across the faces of the air foils 24 and 26. As shown in FIG. 3c, the air moving across the top of the air foils 24 and 26 has a lesser distance to cover than the air moving across the bottom of the air foils 24 and 26. This causes a downwardly directed force 38 to be exerted on the air foils 24 and 26 and therefore, on the pickup truck 10. When the pickup truck 10 slows down such that the velocity of the wind 36 lessens, the air foils 24 and 26 are drawn back to a closed position as shown in FIG. 3b. Having a constant tension on the air foils 24 and 26 provides many advantages. One advantage is that the air foils do not rattle and another advantage is that they can be moved to varying degrees by varying wind speeds. An advantage to these air foils opening from an upwards direction rather than a downwards direction is that they provide a downward force even when they are moved only a small amount. Even when the air foils 24 and 26 are only partially open, there is still a downward force provided by the air foils 24 and 26.

Figure 4A:
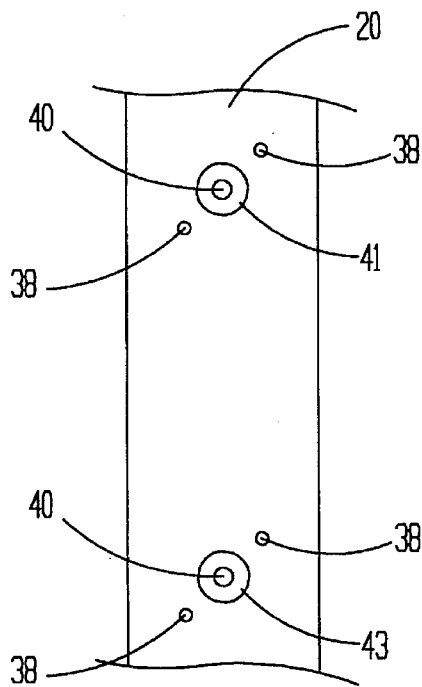
FIG. 4a illustrates a side view of the control frame of the present invention.

Referring now to FIG. 4a, there is shown a side view of the control frame of the present invention. The control frame 20 is shown with the main air foil 24, the auxiliary air foil 26, the main pivot shaft 28 and the auxiliary pivot shaft 32 removed. The body of control frame 20 has six holes disposed therein. Four of the holes 38 are attachment holes used to attach the control assemblies (not shown) to the inside of the control frame 20. Two other holes, an upper hole 41 and a lower hole 43 are used to access an upper pivot bearing 40 and a lower pivot bearing 42 which are located inside of the control frame 20.

Figure 4B:
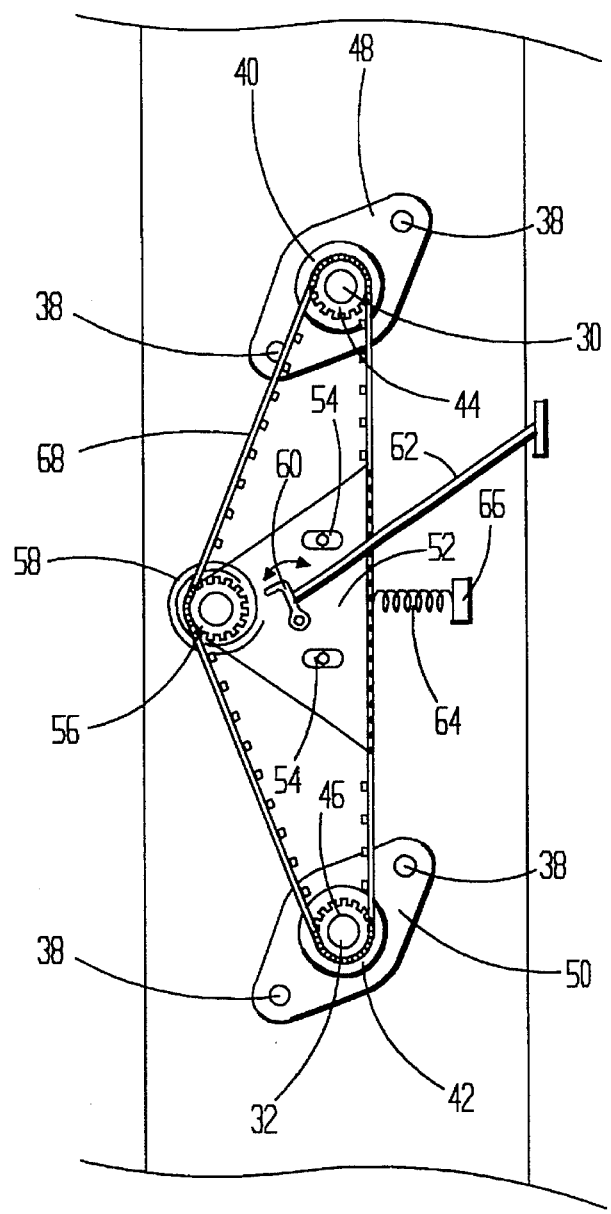
FIG. 4b illustrates an inside view of the control frame of the present invention.

Referring now to FIG. 4b, there is illustrated an inside view of control frame 20. The upper pivot bearing 40 is attached to the control frame 20 by the use of an upper bearing mounting bracket 48 and holes 38. Main pivot shaft 30 passes through a hole (not shown) in the control frame 20. Attached to the main pivot shaft 30 is an upper timing sprocket 44. The upper timing sprocket 44 is attached to the main pivot shaft 30 such that they may not move in relation to each other. The main pivot shaft 30 rotates freely in upper pivot bearing 40. Also shown is lower pivot shaft 32. A lower timing sprocket 46 is attached to the auxiliary pivot shaft 32 such that they may not move in relation to each other. Auxiliary pivot shaft 32 rotates freely in lower pivot bearing 42, which is attached to the control frame 20 through the use of lower bearing mounting piece 50 and the attachment holes 38. A belt tensioner 52 is provided and is attached to control frame 20 by tensioner brackets 54. A toothed tensioner pulley 56 is provided and is attached to the end of tensioner 52. A clock spring 58 is provided with one end thereof attached to the belt tensioner 52 and the other end thereof attached to the toothed tensioner pulley 56 such that pressure may be kept on the tensioner pulley 56. A locking tang 60 is provided and positioned such that it may be moved to come into contact with the toothed tensioner pulley 56 to cause toothed tensioner pulley 56 to become immobile. A tang control rod 62 is provided, such that one end is attached to the locking tang 60 and the other end protrudes outside of the control frame 20, such that the locking tang 60 may be moved forward or backwards to either lock or not lock the toothed tensioner pulley 56. A tensioner spring 64 is provided. One end of the tensioner spring 64 is attached the belt tensioner 52 and the other end thereof is attached to a tensioner spring bracket 66. This keeps pressure on the belt tensioner 52. A timing belt 68 is provided and is connected around the upper timing sprocket 44, the lower timing sprocket 46 and the toothed tension pulley 56, such that when one rotates they all must rotate in unison.

Figure 4C:
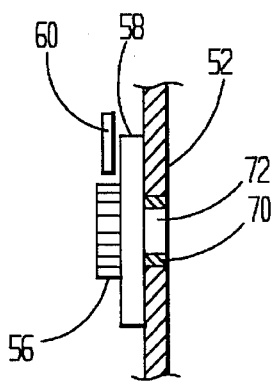
FIG. 4c illustrates a side cross-sectional view of the belt tensioner of the present invention.
Figure 4D:
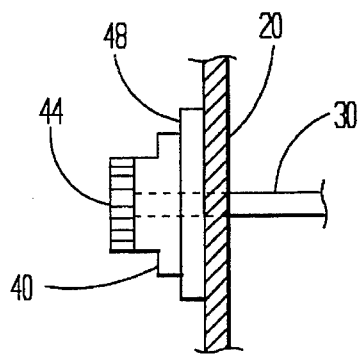
FIG. 4d illustrates a side cross-sectional view of the upper assembly of the present invention.

Referring now to FIG. 4c, there is illustrated a side cross-sectional view of the belt tensioner. The toothed tensioner pulley 56 is shown and the clock spring 58 is shown. These are attached to the belt tensioner 52 by use of a shaft 72 which is movably mounted to the belt tensioner 54 through the use of a tensioner bearing 70. The locking tang 60 is also shown and is positioned such that the toothed tensioner pulley 56 is in a movable position. Referring now to FIG. 4d, there is illustrated a side cross-sectional view of the upper assembly. The upper timing sprocket 44 is shown attached to the main pivot shaft 30. The upper pivot bearing 40 is shown attached to the control frame 20 through the use of the upper pivot mounting piece 48. The main pivot shaft 30 is shown passing through the upper pivot bearing 40, the pivot mounting piece 48 and the control frame 20.

In operation, the timing belt 68 connects the upper timing sprocket 44, the lower timing sprocket 46 and the toothed tensioner pulley 56. The upper timing sprocket 44 is rotatably connected to shaft 30 which is connected to the main air foil 24. The lower timing sprocket 46 is connected to auxiliary pivot shaft 32 which is connected to auxiliary air foil 26. The toothed tensioner pulley 56 is connected to a clock spring 58. This clock spring keeps tension on belt 68 and thereby keeps the air foils (not shown) in a closed position, such that they are vertical in a static position with the pickup truck 10 not moving. When air begins to move past the air foils (not shown), tension is placed on main pivot shaft 30 and auxiliary pivot shaft 32. When this tension overcomes the tension placed on the timing belt 68 by the clock spring 58, the timing belt 68 begins to move, thereby allowing main pivot shaft 30 and auxiliary pivot shaft 32 to turn, thereby allowing the air foils (not shown) to move towards a horizontal position. The timing belt 68 is kept tight around tensioner pulley 56, toothed timing sprocket 44 and toothed timing sprocket 46 by belt tensioner 52. This is moved outward by tensioner spring 64, such that the toothed tensioner pulley 56 pulls timing belt 58 tight around toothed timing sprocket 44 and toothed timing sprocket 46. The locking tang 60 may be moved by the tang control rod 62 to lock the toothed tensioner pulley 56 to any position. The clock spring 58 is set such that its tension opposes the tension due to moving air pushing against the air foils (not shown) and is set to a desired level, whereas the air foils (not shown) will move to a fully horizontal position at a wind speed of around 40 to 60 miles per hour.

Figure 5:
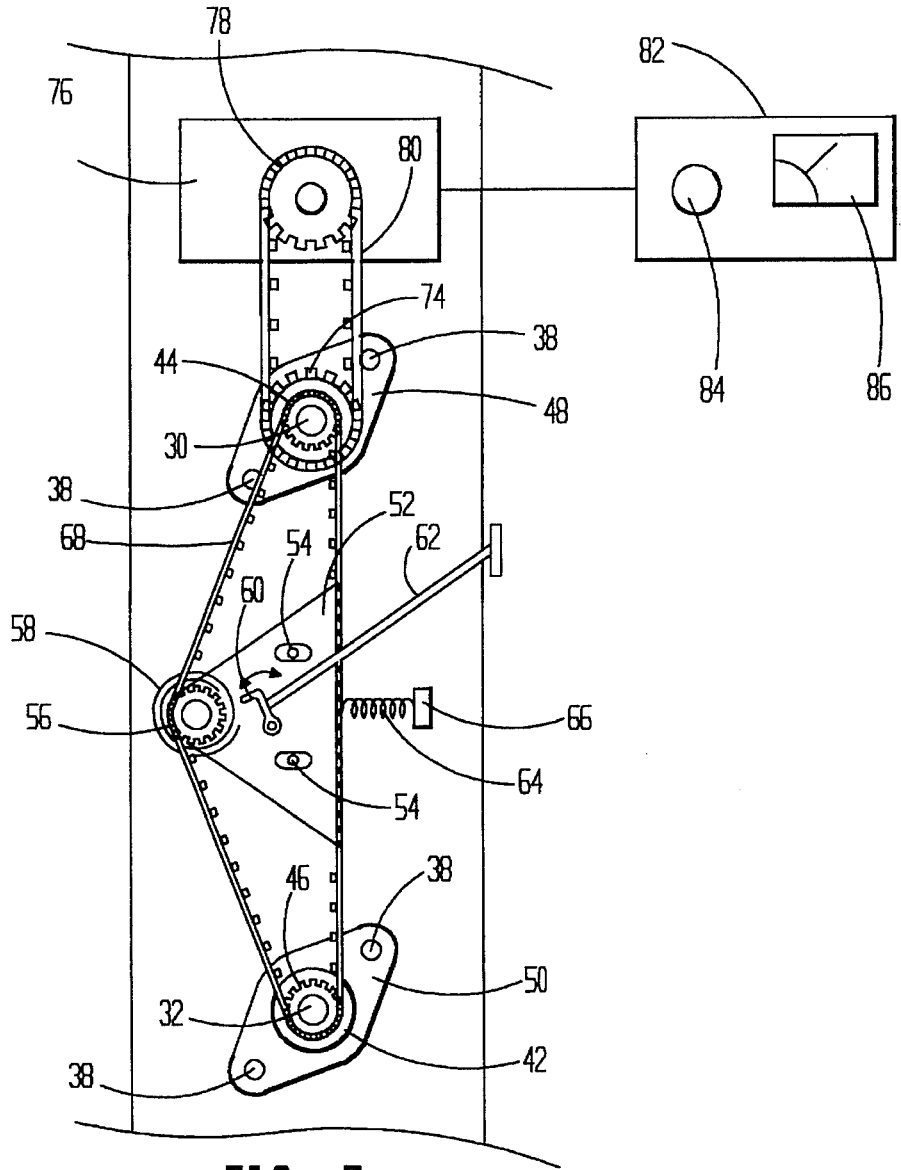
FIG. 5 illustrates an alternate embodiment of the present invention.

Referring now to FIG. 5, there is illustrated an alternate embodiment of the present invention. FIG. 5 illustrates a configuration similar to that shown in FIG. 4c, except that an additional timing sprocket 74 is attached to shaft 30. Also provided is a servo motor 76 having a timing sprocket 78 attached to its drive shaft (not shown). A timing belt 80 connects the timing sprocket 78 with the timing sprocket 74 which is connected to the main pivot shaft 30. Also provided is a control unit 82. In operation, the servo motor 76 is controlled by the control unit 82. The servo motor 76 then turns the timing sprocket 74 which thereby turns the upper timing sprocket 44, the main pivot shaft 30 and the timing belt 68. In this way, the servo motor 76 controls both the main air foil (not shown) and the auxiliary air foil (not shown). The servo motor 76 has a potentiometer position sensor which changes its resistance according to the position of the air foils. This resistance is read by a comparator circuit in the control unit 82 located inside of the pickup truck 10 (not shown). The comparator circuit compares the resistance of the position sensor potentiometer with the resistance control knob 84 on control unit. The position is indicated by an ohm meter 86 located in the control unit 82. Thus, the control knob position dictates the operation of the servo motor 76.

In summary, there has been provided a tailgate with an integrated air foil mechanism. The tailgate includes two control frames, a main air foil wing and control apparatus. The two control frames are mounted on the pickup truck side walls at the open trailing end of the cargo area. The main air foil wing has two ends, each end pivotally mounted on the control frame, such that the main air foil wing spans the opening between the control frames. The control apparatus is operable such that tension from the control apparatus mounted in the control frames causes the air foil to be parallel with the control frames until the pickup reaches a sufficient speed causing the main air foil wing to pivot, such that it is perpendicular to the control frame, thereby creating an upwards or downwards force.

Although the preferred embodiment has been described in detail, it should be understood that various changes, substitutions and alterations can be made therein without departing from the spirit and scope of the invention as defined by the appended claims.

What is claimed is:

1. A tailgate with an integrated air foil mechanism for a pickup truck having an open top cargo area defined by three side walls and an open trailing end, comprising:

first and second control frames mounted on opposite ones of the pickup truck side walls, respectively, proximate to the open trailing end of the cargo area;

a main air foil wing having two ends, a convex side and a concave side, each end pivotally mounted to one said control frame, such that said main air foil wing spans the open trailing end between said control frames; and a control apparatus mounted in at least one of said control frames, said control apparatus operable to cause said air foil to be positioned substantially parallel with said control frames in a substantially vertical position until the pickup truck reaches a sufficient speed wherein said control apparatus permits the main air foil wing to pivot such that it is substantially horizontal;

said control apparatus having:
a timing sprocket mounted on said pivot shaft inside of said first and second control frames,
a toothed tensioner pulley mounted on a tensioner spring, and
a toothed timing belt positioned around a portion of the circumference of said timing sprocket and said toothed tensioner pulley.

2. The apparatus of claim 1 and further comprising a clock spring mounted concentric with said tensioner pulley and attached such that said clock spring causes said tensioner pulley to move said timing belt causing the toothed timing sprocket to move said pivot shaft causing said main wing to remain parallel with said control frame until a certain amount of wind on said main air foil wing overcomes the force of said clock spring and moves said main air foil wing to a position wherein it is horizontal.

3. The apparatus of claim 2 and further comprising a belt lock having a mechanical stop to restrict movement of the tensioner pulley such that said main air foil wing may be held in a horizontal position against the normal movement of said clock spring.

4. The apparatus of claim 1 and further comprising a servo-drive motor located in one of said control frames and connected to said toothed timing sprocket such that it may rotate said pivot shaft and therefore rotate said main air foil wing.

5. A method for producing upward or downward force for a pickup truck having an open top cargo area defined by three side walls and an open trailing end, comprising:

mounting first and second control frames on opposite ones of the pickup truck side walls respectively, proximate to the open trailing end of the cargo area;

pivotally mounting a main air foil wing having two ends, a convex side and a concave side to the first and second control frames, such that the main air foil wine spans a distance between the first and second control frames; and controlling the air foil using a control apparatus to cause the main air foil to be positioned substantially parallel with the control frames in a substantially vertical position until the pickup truck reaches a sufficient speed wherein the control apparatus permitting the main air foil wing to pivot such that it is substantially perpendicular to the control frames in a horizontal position;

the step of controlling including the steps of:
mounting a timing sprocket on the pivot shaft inside one of the first and second control frames,
mounting a toothed tensioner pulley on a tensioner spring, and
tensioning a toothed timing belt positioned around a portion of the circumference of the timing sprocket and the toothed tensioner pulley.

6. The method of claim 5 and further comprising the step of mounting a clock spring concentric with the tensioner pulley and attaching it such that the clock spring causes the tensioner pulley to move the timing belt causing the toothed timing sprocket to move the pivot shaft causing the main wing to remain parallel with the control flame until a certain amount of wind on the main air foil wing overcomes the force of the clock spring and moves the main air foil wing to a position whereas it is perpendicular to the control flames.

7. The method of claim 6 and further comprising the step of mounting a belt lock having a mechanical stop to restrict movement of the tensioner pulley such that the main air foil wing may be held in a position perpendicular to the control frame in a vertical position against the normal movement of the clock spring.

8. The method of claim 5 and further comprising mounting a servo-drive motor in one of the first and second control frames and connecting it to the toothed timing sprocket so that it may rotate the pivot shaft and therefore rotate the main air foil wing.

* * * * *

UNITED STATES PATENT AND TRADEMARK OFFICE
CERTIFICATE OF CORRECTION

PATENT NO. : 5,486,032

DATED : January 23, 1996

INVENTOR(S) : Reed, et al.

It is certified that error appears in the above-indentified patent and that said Letters Patent is hereby corrected as shown below:

Column 6, Claim 5, line 63, replace "wine" with --wing --.

Column 8, Claim 6, line 5, replace "flames" with --frames--.

Signed and Sealed this

Twenty-fifth Day of June, 1996

Attest:

BRUCE LEHMAN

*Attesting Officer*    *Commissioner of Patents and Trademarks*